United States Patent [19]

Hartman

[11] Patent Number: 5,588,933
[45] Date of Patent: * Dec. 31, 1996

[54] INFINITE RATIOS CANT WHEEL TRANSMISSION

[76] Inventor: Delbert L. Hartman, Rte. #1 P.O. Box 292, Mcgaheysville, Va. 22840

[*] Notice: The terminal 11 months of this patent has been disclaimed.

[21] Appl. No.: 110,738

[22] Filed: Aug. 23, 1993

[51] Int. Cl.$^6$ .................................................. F16H 15/18
[52] U.S. Cl. ........................................................... 476/51
[58] Field of Search .............................................. 476/51

[56] References Cited

U.S. PATENT DOCUMENTS

| | | | |
|---|---|---|---|
| 168,912 | 10/1875 | Mead | 476/51 X |
| 675,133 | 5/1901 | Janssens | 476/51 |
| 1,081,799 | 12/1913 | Whipple | 476/51 X |
| 1,354,486 | 10/1920 | Jacques | 476/51 X |
| 1,358,447 | 11/1920 | Hupp | 476/51 X |
| 1,844,239 | 2/1932 | Boehme et al. | 476/51 X |
| 3,286,537 | 11/1966 | Riley | 476/51 |

FOREIGN PATENT DOCUMENTS

| | | | |
|---|---|---|---|
| 773951 | 11/1934 | France | 476/51 |
| 1082168 | 12/1954 | France | 476/51 |
| 831180 | 2/1952 | Germany | 476/51 |
| 179156 | 2/1966 | U.S.S.R. | 476/51 |
| 722605 | 1/1955 | United Kingdom | 476/51 |
| 926835 | 5/1963 | United Kingdom | 476/51 |

*Primary Examiner*—Allan D. Herrmann
*Attorney, Agent, or Firm*—Keith Goodenough

[57] ABSTRACT

This invention relates to friction drive transmissions of the variable or infinite ratio type, having two oppositely tapered shafts, bearing mounted and housed in the same plane and equally spaced apart along their length. A vertical and horizontally mobile rack is mounted between the shafts in a plane parallel but perpendicular to theirs. On the said rack are journaled two intermediary wheels so mounted as to synchronously rotate, slide and cant while one or the other of the intermediary wheels is in contact with the said shafts. Two more intermediary wheels are so mounted as to provide reverse rotation of the output shaft.

4 Claims, 6 Drawing Sheets

INFINITE RATIOS CANT WHEEL TRANSMISSION

SUMMARY OF THE INVENTION

This invention is a friction drive, infinite ratio transmission, using tapered input and output shafts, oppositely mounted and housed in the same plane, being equally spaced apart along their lengths. Between the said shafts and in a plane perpendicular to theirs is a rack so mounted as to be moveable both horizontally and vertically, as seen from the end of the transmission. On the rack are mounted two intermediary wheels, whose diameters are slightly larger than the space between the shafts and may optionally contact the said shafts for the purpose of transferring power from the input shaft to the output shaft or visa-versa. The said intermediary wheels are so mounted on the said rack as to synchronously engage the said shafts, rotate, cant and slide, providing for upshift, downshift, neutral and park. Also provided are two more intermediary wheels mounted on the housing at the low ratio end of the transmission, whose combined diameters are slightly larger than the space between the shafts, so mounted as to synchronously contact one another and the said shafts from opposite sides, causing the output shaft to reverse rotation.

BACKGROUND OF THE INVENTION

I had thought the use of tapered shafts was original with myself. However a patent search revealed that not only had others attempted to use these devices to affect an infinite ratio transmission, but that they had also encountered similar problems, primarily that in the use of tapered shafts it is very difficult to move a transfer device along the shafts while they are under load. The second problem in a friction drive transmission is slippage. In the past most of these transmissions have relied on integral pressure between the transfer members, to transmit power, thus limiting the load capacity to the amount of internal pressure applied. This limitation is undesirable not only because it limits the load but also because this type of construction results in substantial power loss caused by constant bearing pressure. This has been an obvious handicap since bearing pressure in gear type transmissions varies with the load. A third problem was to provide for a downshift mechanism. A fifth problem was to provide for a neutral position in the transmission shift pattern. It is the object of this invention to solve these problems.

DETAILED DESCRIPTION

Referring now more specifically to the drawings the numeral 1 designates the Infinite Ratios Cant Wheel Transmission. The transmission 1 includes a housing referred to by the numeral 2 within which are bearing mounted in the same plane a pair of oppositely tapering, input and output shafts 3 and 4. Between the shafts 3 and 4 and in a plane parallel but perpendicular to theirs is mounted a rack 5 having both horizontal and vertical motion. The horizontal and vertical motion of the slide rack is achieved by mounting the rack 5 on two pins 26 and 27 the pins 26 and 27 extend from the ends of the rack 5. The pins 19 and 20 protrude into two oval cups 21 and 22 which are pivoted on axels 38 and 39, the interior of cups 21 and 22 being race track shaped to minimize play. When a intermediary wheel 6 or 7 is engaged in the shafts 3 and 4 the pins 19 and 20 are at one side or the other of the pivotal oval cups 21 and 22 allowing for vertical motion. The purpose for the horizontal mobility of the rack 5 is so either of the intermediary wheels 6 or 7 may engage the tapered shafts 3 and 4. The purpose for the vertical mobility of the rack is that as the intermediary wheels 6 or 7 move along the tapered shafts 3 and 4 their relationship to the center of the transmission 1 is constantly changing both vertically and horizontally. Since the rack 5, the intermediary wheels 6 and 7 and their brackets 36 and 37 and the shifting levers 13 and 14 all move together horizontally, the plate 23 through which the shifting levers 13 and 14 protrude must also move horizontally, hence the transmission housing provides for two slots 24 and 25 along the side of the transmission housing 2 and two slots 28 and 29 along the ends of the transmission housing 2 in which the plate 23 rests.

Mounted on the rack 5 are two intermediary wheels 6 and 7 whose diameters are slightly larger than the space between the shafts 3 and 4, their brackets 36 and 37 are coupled together by a swivel 8. The intermediary wheels 6 and 7 are so mounted on the rack 5 within brackets 36 and 37 as to synchronously slide are rack 5, rotate and cant on slide balls 9 and 10 and pins 41, 42, 43, and 44. Mounted on the intermediary wheel bearing casings 11 and 12 are two brackets 36 and 37 and two levers 13 and 14 and which extend through slots 47 and 46 of plate 23 providing the operator control of the cant and placement of the intermediary wheels 6 and 7.

The rack 5 is controlled by two levers 19 and 20 mounted and housed one on either side of the transmission housing 2. Levers 19 and 20 are connected to the rack 5 by cables 30 and 31 and their bushings 32 and 33 and then if desired to the brake and accelerator in a vehicle application providing the operator horizontal control of the rack. The purpose of having two intermediary wheels 6 and 7 is as follows.

When an intermediary wheel 6 or 7 is caused to contact the tapered shafts 3 and 4 the intermediary wheel 6 or 7 is gripped by the resistance of the driven shaft 3 or 4 to the intermediary wheel 6 or 7 and the intermediary wheel 6 or 7 is also gripped by the driving shaft 3 or 4 as the driving shaft meets the resistance of the intermediary wheel 6 or 7. The driving shaft 3 or 4 and its rotation clockwise or counterclockwise determines the appropriate intermediary wheel 6 or 7 to be engaged.

When an intermediary wheel 6 or 7 is engaged it will remain in a fixed position on the shafts 3 and 4 as long as the vertical plane of the intermediary wheel 6 or 7 remains perpendicular to the horizontal plane of the shafts 3 and 4. However when the engaged intermediary wheel 6 or 7 is canted in either direction it will travel along the shafts 3 and 4, thus producing an infinite number of ratios while under load. However in a vehicle application one of the shafts 3 or 4 is driving during acceleration and the other shaft 3 or 4 is driving during deacceleration, hence the need for two intermediary wheels. The one intermediary wheel 6 or 7 is engaged by horizontal movement of the rack 5 and canted by a means of a lever 13 or 14 causing the transmission 1 to upshift or down shift during acceleration. The other intermediary wheel 6 or 7 is caused to engage the shafts 3 and 4 by the reverse horizontal movement of the rack 5 and given the appropriate cant by a lever 13 or 14 will downshift the transmission 1 during deacceleration slots 47 and 46 allow levers 13 and 14 to move with intermediary wheels 6 and 7.

Mounted inside the transmission 1 and on the low ratio end of the housing 2 are two intermediary wheels 15 and 16 whose combined diameters are slightly greater than the space between the shafts 3 and 4. These two intermediary wheels are bearing mounted within a bracket 17 and pivoted on an axel 39 midway between the shafts 3 and 4. When the intermediary wheels 6 and 7 are so positioned by the rack 5 as to not engage the shafts 3 and 4, the intermediary wheels 15 and 16 may be caused to engage the shafts 3 and 4 by use of lever 18 and slot 45 causing the reverse rotation of the tapered shaft 3 or 4. Counter resistance again is the engaging factor. Note the oval cup 22 is mounted on the bracket 17 since their centers are the same.

The foregoing is considered as illustrative only of the principles of the invention, hence it is not desired to limit the invention to the exact construction shown and accordingly all suitable modifications and equivalents may be restored to falling within the scope of the invention.

I claim:

1. An infinitely variable ratio transmission including a housing a pair of laterally spaced and registered tapered input and output shafts journaled from said housing about substantially parallel axis and including adjacent peripheral portions disposed in substantially parallel axis and including adjacent peripheral portions disposed in substantially parrallel planes, a pair of cantable intermediary power transmitting wheel journaled on said rack including surface areas disposed in optional resistance frictional engagement with the outer surface of said shafts and means operative to shift said cantable intermediary wheels along said rack also including two more intermediary wheels journaled within said bracket and means operative to reverse rotation of said output shaft.

2. The transmission of claim 1 wherein said means operative to shift said cantable intermediary wheels includes two slide balls, said rack which is horizontally and vertically mobile and the means operative to shift said rack and cant said intermediary wheels by means of said slide balls.

3. The transmission of claim 1 wherein said means operative to reverse rotation pivots said bracket to reverse rotation of said output shaft.

4. The transmission of claim 1 wherein said means operative to shift causing said cantable intermediary wheels to cant and thereby move along said tapered shafts while in contact therewith and thus to produce an infinite number of ratios.

\* \* \* \* \*

UNITED STATES PATENT AND TRADEMARK OFFICE
CERTIFICATE OF CORRECTION

Page 1 of 4

PATENT NO. : 5,588,933
DATED : Dec. 31, 1996
INVENTOR(S) : Delbert L. Hartman

Figure 1:
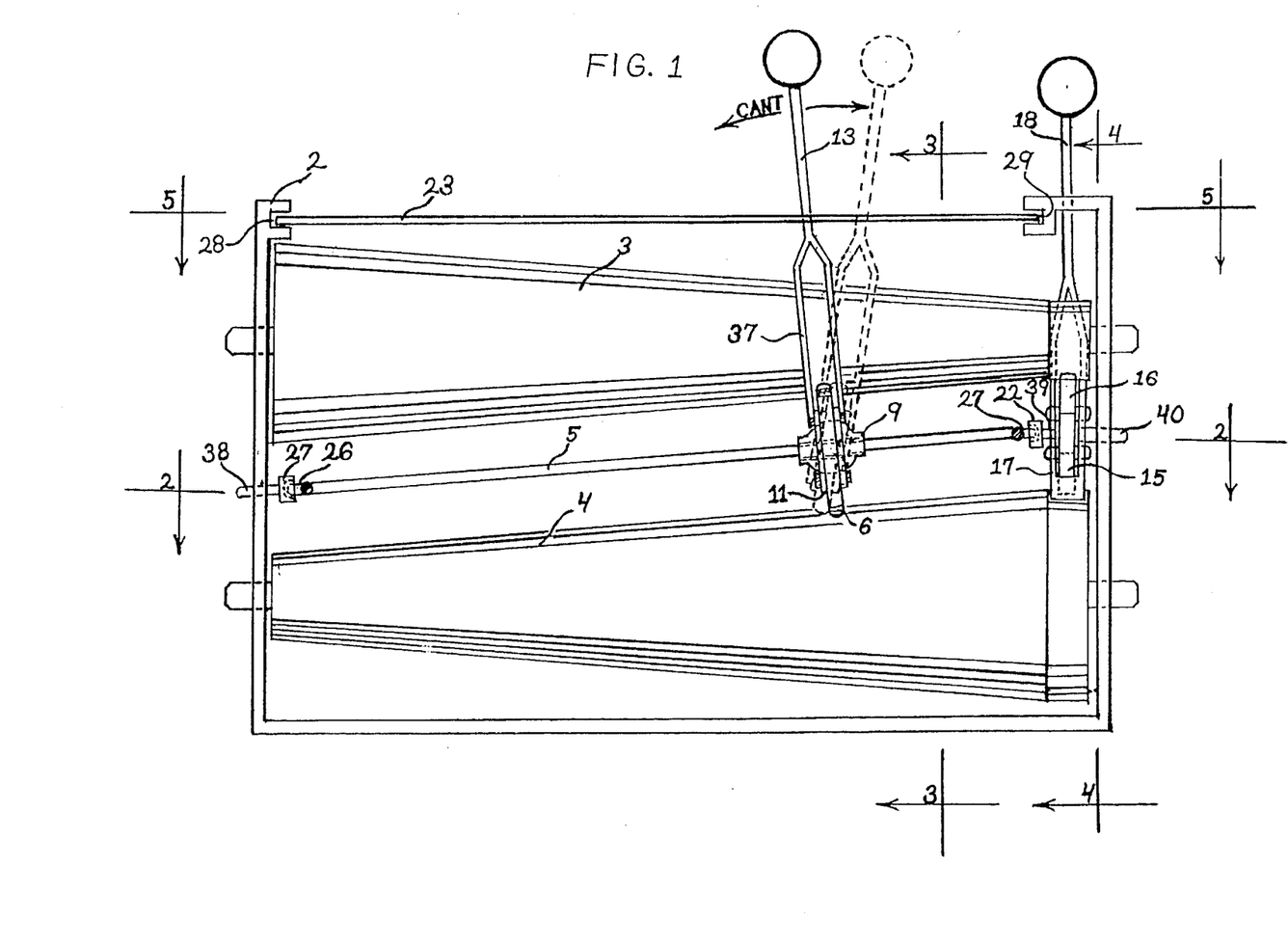
FIG. 1 is a side view of the internal components of the transmission with the exception of the rack shifting lever and bar
Figure 2:
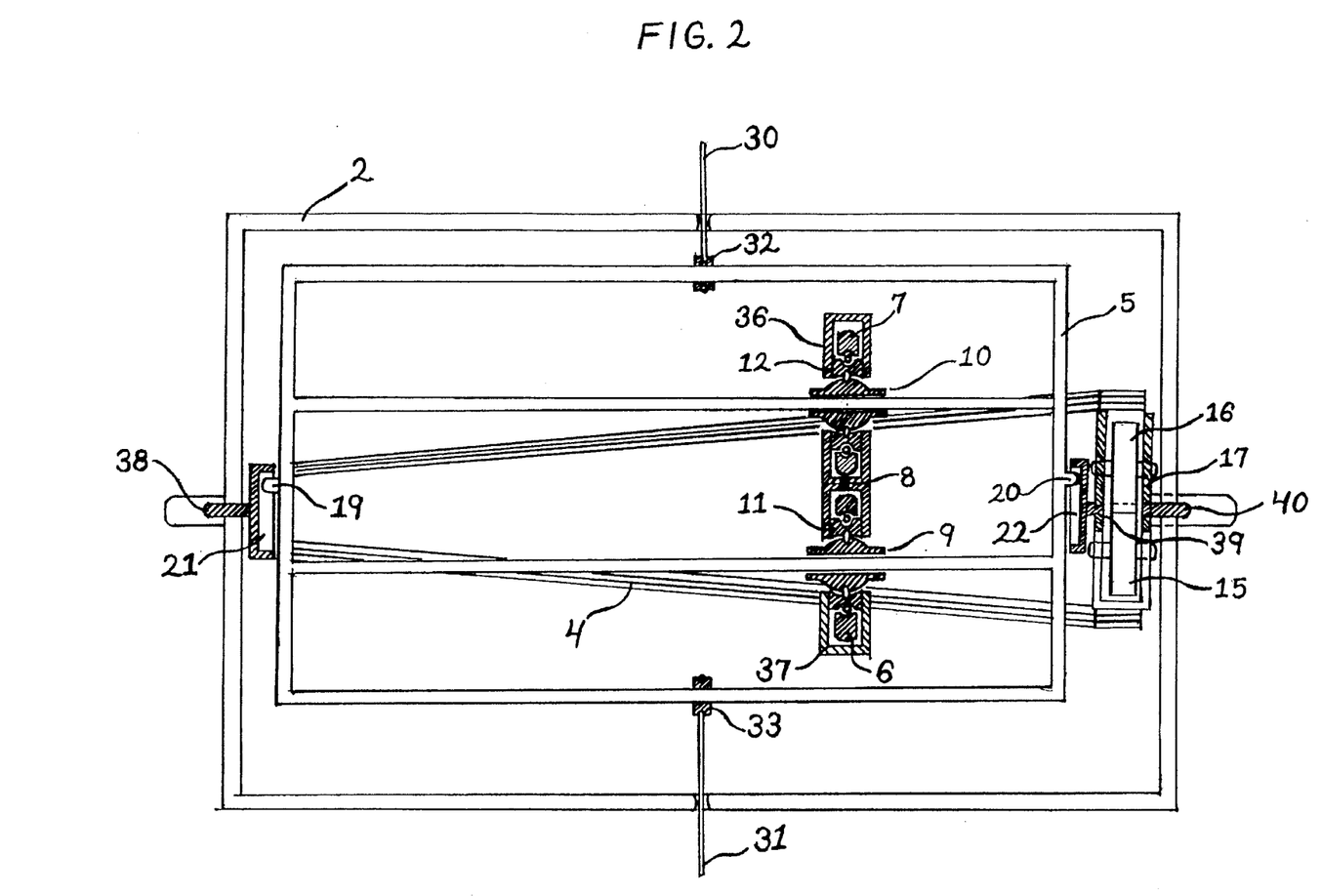
FIG. 2 is a longitudinal sectional view taken upon the plane indicated by the section line 2—2 of FIG. 1.
Figure 3:
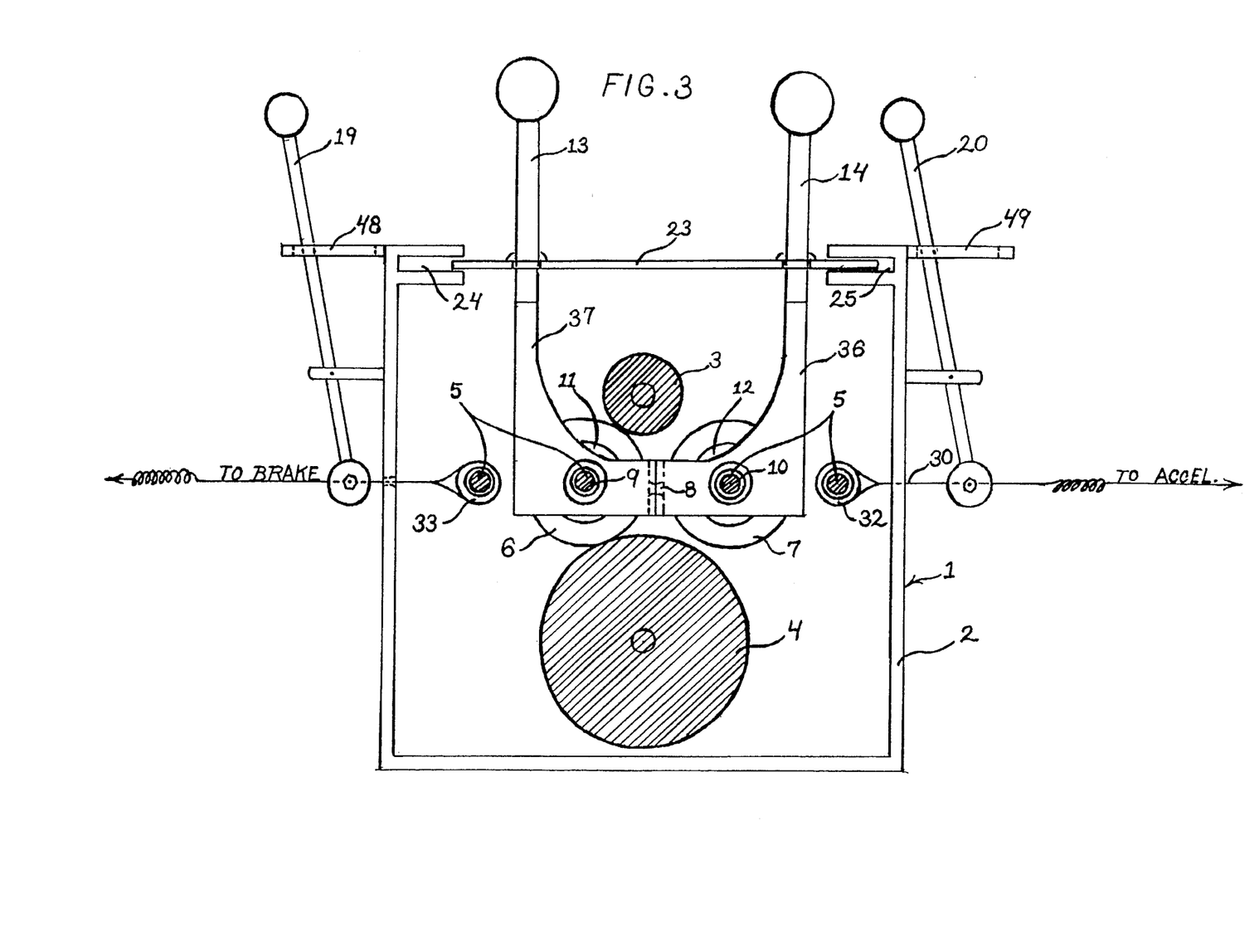
FIG. 3 is a transverse sectional view taken upon the plane indicated by the section line 3—3 of FIG. 1 to show the reverse mechanism only.
Figure 4:
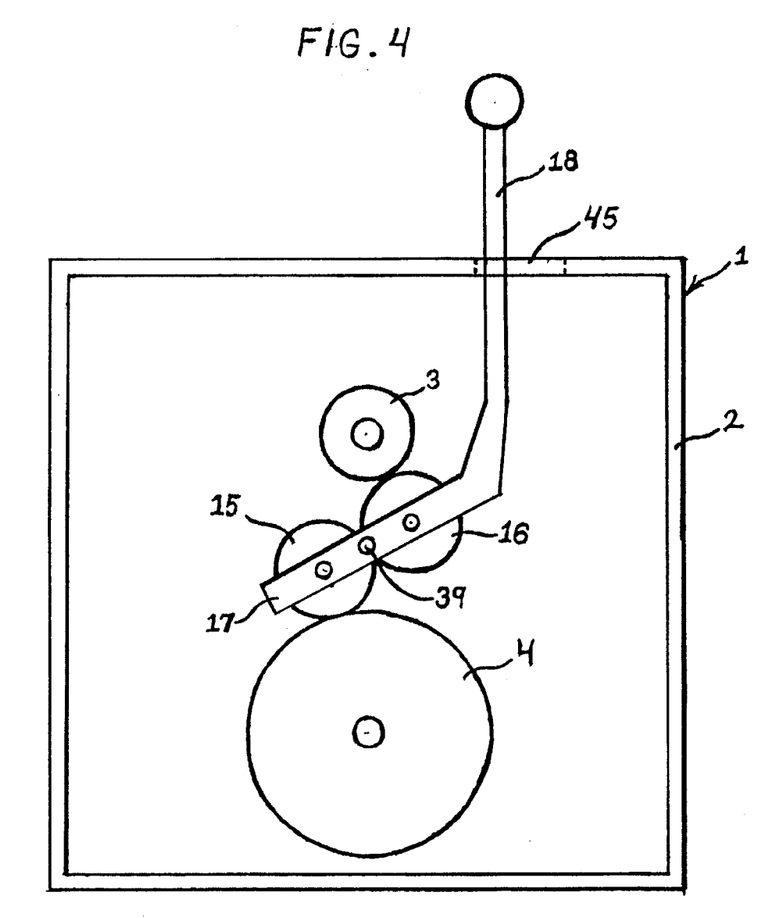
FIG. 4 is a transverse sectional view taken upon the plane indicated by the section line 4—4 of FIG. 1.
Figure 5:
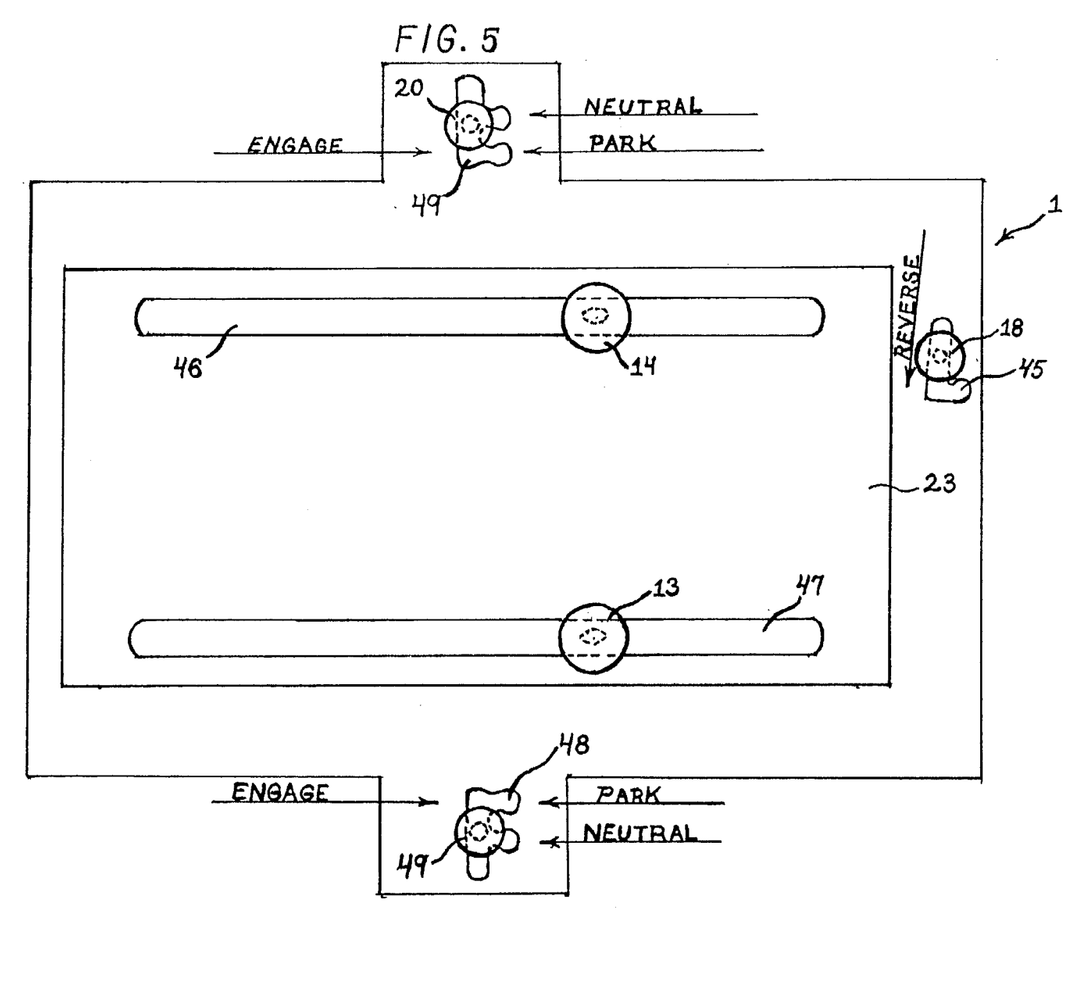
FIG. 5 is a top view of the transmission housing, to show shifting slots and patterns, taken upon the plane indicated by the section line 5—5 of FIG. 1.
Figure 6:
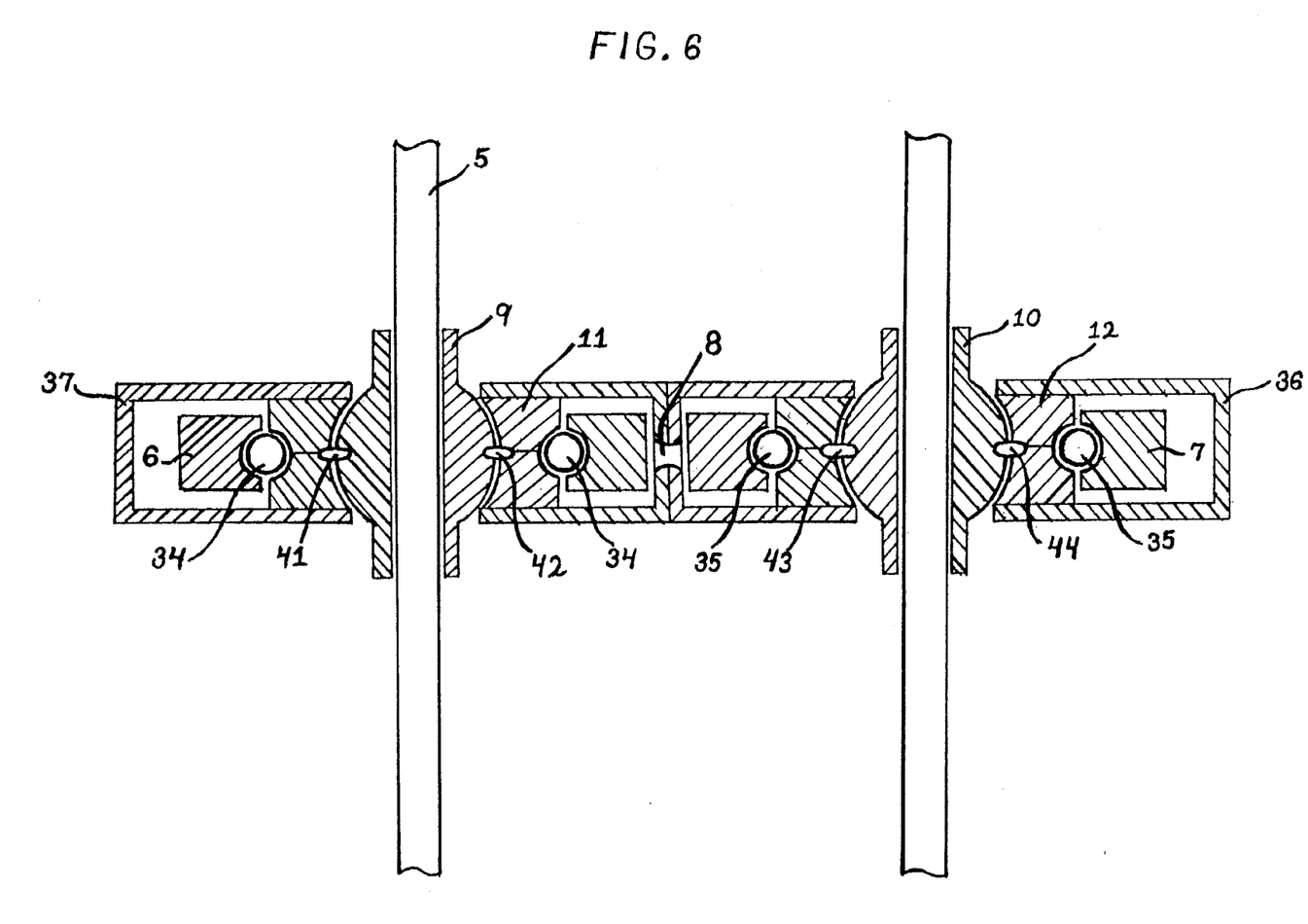
FIG. 6 is an enlarged, crosscut of the intermediary cant wheels as seen in FIG. 2.

It is certified that error appears in the above-indentified patent and that said Letters Patent is hereby corrected as shown below:

On title page, item [76] Inventor's address should read --8 Conley Rd. Stanardsville, VA 22973--
On title page, before item [57] delete "Attorney, Agent, or Firm"
The title page, showing the illustrative figure, should be deleted to be replaced with the attached title page.
The drawing sheets, consisting of Figs. 1 and 2, should be deleted to be replaced with the drawing sheets, consisting of Figs. 1 and 2, as shown on the attached pages.
Column 1, line 45 "(fifth)" should read --(fourth)--
Column 2, line 12, "(19and 20)" should read --(26 and 27)--
Column 2, line 16, "(19 and 20)" should read --(26 and 27)--
Column 2, line 38, "(slide are rack)" should read --(slide on rack)--
Column 2, line 41, "(13 and 14 and which)" should read --(13 and 14, which)--
Column 3, line 12, "(deacceleration slots)" should read --(deacceleration. Slots)--
Column 3, line 30, "(be restored to) should read --(be resorted to)--
In the Claims
Claim 1, column 4, line 9, "(wheel journaled)" should read --(wheels journaled)--
Claim 3, column 4, line 23, "(pivot said bracket)" should read --(pivots, said- bracket and bracket components)--
Claim 4, column 4, line 26, "(shift causing)" should read --(shift, causing)--

Signed and Sealed this

Twenty-first Day of October 1997

Attest:

BRUCE LEHMAN

Attesting Officer

Commissioner of Patents and Trademarks

United States Patent [19]
Hartman

[11] Patent Number: 5,588,933
[45] Date of Patent: * Dec. 31, 1996

[54] INFINITE RATIOS CANT WHEEL TRANSMISSION

[76] Inventor: Delbert L. Hartman, Rte. #1 P.O. Box 292, Mcgaheysville, Va. 22840

[*] Notice: The terminal 11 months of this patent has been disclaimed.

[21] Appl. No.: 110,738

[22] Filed: Aug. 23, 1993

[51] Int. Cl.⁶ .................................................. F16H 15/18
[52] U.S. Cl. ................................................................ 476/51
[58] Field of Search .................................................. 476/51

[56] References Cited

U.S. PATENT DOCUMENTS

| | | | |
|---|---|---|---|
| 168,912 | 10/1875 | Mead | 476/51 X |
| 675,133 | 5/1901 | Janssens | 476/51 |
| 1,081,799 | 12/1913 | Whipple | 476/51 X |
| 1,354,486 | 10/1920 | Jacques | 476/51 X |
| 1,358,447 | 11/1920 | Hupp | 476/51 X |
| 1,844,239 | 2/1932 | Boehme et al. | 476/51 X |
| 3,286,537 | 11/1966 | Riley | 476/51 |

FOREIGN PATENT DOCUMENTS

| | | | |
|---|---|---|---|
| 773951 | 11/1934 | France | 476/51 |
| 1082168 | 12/1954 | France | 476/51 |
| 831180 | 2/1952 | Germany | 476/51 |
| 179156 | 2/1966 | U.S.S.R. | 476/51 |
| 722605 | 1/1955 | United Kingdom | 476/51 |
| 926835 | 5/1963 | United Kingdom | 476/51 |

*Primary Examiner*—Allan D. Herrmann
*Attorney, Agent, or Firm*—Keith Goodenough

[57] ABSTRACT

This invention relates to friction drive transmissions of the variable or infinite ratio type, having two oppositely tapered shafts, bearing mounted and housed in the same plane and equally spaced apart along their length. A vertical and horizontally mobile rack is mounted between the shafts in a plane parallel but perpendicular to theirs. On the said rack are journaled two intermediary wheels so mounted as to synchronously rotate, slide and cant while one or the other of the intermediary wheels is in contact with the said shafts. Two more intermediary wheels are so mounted as to provide reverse rotation of the output shaft.

4 Claims, 6 Drawing Sheets

FIG. 2